Patented Mar. 25, 1952

2,590,076

UNITED STATES PATENT OFFICE 2,590,076

TREATMENT OF WINES

Julius H. Fessler, Berkeley, Calif.

No Drawing. Application December 29, 1948,
Serial No. 68,067

4 Claims. (Cl. 99—35)

This invention relates to treatment of wines to improve their clarity and stability.

As wine is produced, it contains substances which with the passage of time coagulate to form a cloud or precipitate in the wine; with a white wine or a light red wine, this is particularly objectionable. To prevent this, the wine is held at an elevated temperature, e. g. 140° F. for a sufficient period, usually several hours, to coagulate these substances which are then settled and removed.

Wine also contains living substances such as yeasts and bacteria, e. g. lactic and vinegar bacteria. To prevent these from affecting the wine adversely, it is usual to pasteurize the wine by heating it to a temperature 180°–190° F. for from one to ten minutes, or at lower temperatures for correspondingly longer periods of time; it is not uncommon for the wine to be subject to as many as four pasteurization before the wine reaches the consuming public. Also, during storage, it is usual to have sufficient sulfur dioxide ($HSO_3$— in solution), supplied by sodium bisulfite, potassium metabisulfite, or by adding sulfur dioxide as such or in aqueous solution, to insure that bacterial action or yeast growth does not occur or is reduced to a tolerable minimum.

It is generally recognized that the more wine is processed, the greater is the reduction in the quality of the wine, for the wine picks up added metal from the equipment and this adversely affects the taste and quality of the wine; usually, the wine must be treated additionally for removal of these. Also, heating wine to coagulate components present or to pasteurize the wine causes oxidation of various of the constituents of the wine with an adverse effect upon the flavor and taste of the wine.

The process of the present invention contemplates treatment of the wine to reduce the bacterial and yeast content so that these are reduced below that at which growth occurs; while the wine is not necessarily strictly sterile in the sense that it may still contain yeast and bacteria, nevertheless, the content of these per unit volume of wine is such that bacteria and yeast do not grow in the wine. This reduction is effected in a very simple and expeditious manner, that is, by filtering the wine through a suitable filter medium and then passing it through sterile equipment, into sterile bottles which are then closed and put into the channels of commerce for the consuming public, or else into sterile containers for storage until such time as the wine is needed. The filtration is also effective to remove such a large proportion of the heat coagulable substances in suspension that subsequent heating of the wine is unnecessary.

It is in general the broad object of the present invention to provide a novel process for treatment of wines to the end that the bacterial and yeast content of the wine is reduced below that at which growth of these occurs.

The invention includes other objects and features of advantage, some of which, together with the foregoing, will appear hereinafter wherein the present preferred process of this invention is disclosed.

In practicing the invention, a filter is first prepared and the filtering elements thereof are precoated with a suitable filter aid. I have successfully used that diatomaceous earth filter aid known as Super-Cel and other diatomaceous earths of similar quality as will retain yeasts and bacteria if used as a precoat or an impregnation of the filter, precoating the filter element suitably to effect such a bacterial and yeast removal as will reduce the content of these below that at which growth occurs; more specifically, upon a plate or screen filter, utilizing filter screens with filter paper or cloth as the supporting medium on the several plates or screens, I have applied a diatomaceous earth filter aid such as Super-Cel at the rate of 8 ounces per square foot of filter area. When a paper or asbestos pad is utilized, the filter aid deposit can be made somewhat lighter, and I have successfully used a deposit of 4 ounces per square foot of filter surface.

After the filter is set up and the plates have been precoated, I preferably circulate a citric acid solution through the filter and through that equipment through which the wine must pass. This removes any materials which might impart an off-taste or odor to the wine as well as any metal oxides which are present, so reducing the metal pick-up. In place of citric acid, one can use any other suitable weak fruit acid which is not too corrosive, such as acetic or tartaric acid. The system is then flushed with water, after which that portion of the equipment beyond the filter is then flushed with water, then followed with a sterilizing solution such as that provided by an aqueous solution of a quaternary. These are well known and are particularly described in Patents 2,060,850, 2,176,896, and 2,200,603. Any other cold sterilizing agent can be employed; I prefer to use such an agent rather than steam since they are more effective and are handled more readily. After the sterilization, the equipment is flushed with water. The wine is then passed through the filter and on into sterile bottles or other sterile containers where it can remain until needed without any sulfur dioxide being present. The over-all number of operations performed on the wine is obviously materially reduced.

The life of the precoat on the filter depends upon the brilliance desired in the wine and the rate of flow required; usually the filter can be used from 3 to 6 days before being cleaned and re-precoated, being flushed out each morning with sterilizing solution to insure that the equipment is sterile. The extent of the precoat of the diatomaceous earth should be such that the filtered wine has a bacterial and a yeast content below that at which growth occurs.

In an operation conducted in accordance with the present invention, a ten plate filter having asbestos paper filter pads was coated with 4 ounces per square foot of Super-Cel. A California white wine was then passed through the filter, that portion of the equipment between the filter and the point at which the wine was delivered to the sterile containers having been first sterilized by utilizing an aqueous solution of a quaternary, e. g. dimethyl-9-octadecenyl ammonium bromide. The wine was passed through the filter under a pressure of 2 pounds gauge. Periodic samples of the wine were taken and tested, being subject to the equivalent of a year's storage. The wine remained free of any bacteria or yeast growth and was characterized by an increase in its brilliance.

In another operation conducted in accordance with the present invention, a ten plate filter having paper filter pads was coated with 8 ounces per square foot of Super-Cel. A California white wine was then passed through the filter, that portion of the equipment between the filter and the point at which the wine was delivered to the sterile containers having been first sterilized by utilizing an aqueous solution of a quaternary, e. g. dimethyl-9-octadecenyl ammonium bromide. The wine was passed through the filter under a pressure between 15 and 20 pounds gauge. Periodic samples of the wine were taken and tested, being subject to the equivalent of a year's storage. The wine remained free of any bacteria or yeast growth and was characterized by an increase in its brilliance.

As an alternative procedure, the wash with the citric acid or other fruit acid solution can be omitted, and the entire filtering system can be washed with a cold sterilizing solution, dependence being placed upon this to remove those components which might be present which might impart an undesirable taste to the wine.

In filtering the wine, it is preferred to employ gravity filtration and to keep the pressure in any case under about 20 pounds per square inch gauge, for as one exceeds 14 pounds pressure, there is a tendency for the bacteria and yeast to pass the filter and for an undesirable number of these to be present in the wine.

While the invention has been described as it has been particularly practiced upon wine with success, it is to be understood that it is not limited in application to wine and that it can be applied with equal success to any fluid subject to bacterial spoilage because of entrained yeasts and bacteria such as fruit juices, vinegars, soft-drink beverages, beer, and the like; in the claims, the term wine is employed broadly and as referring to and including such fluids.

I claim:

1. A process for treating wine to obviate pasteurization and the incorporation of bactericide additives, comprising precoating a multiplate filter with a diatomaceous earth filter aid, washing the precoated filter with an aqueous fruit acid solution, flushing the washed filter with water, and filtering the wine through the so-prepared filter to reduce the bacteria and yeast content below that at which growth occurs, and collecting the filtered wine in sterile equipment.

2. A process for treating wine to obviate pasteurization and the incorporation of bactericide additives, comprising precoating a multiplate filter with a diatomaceous earth filter aid, washing the precoated filter with an aqueous fruit acid solution, flushing the washed filter with water, sterilizing the filter and that equipment beyond the filter to a point of collection with a liquid sterilizing agent, and filtering the wine through the so-prepared filter to reduce the bacteria and yeast content below that at which growth occurs, and removing the wine from the filter and collecting the filtered wine in sterile equipment.

3. A process for treating wine to obviate pasteurization and the incorporation of bactericide additive, comprising precoating a multiplate filter with a diatomaceous earth filter aid, sterilizing the filter and that equipment beyond the filter to a point of collection, filtering the wine through the filter to reduce the bacteria and yeast content below that at which growth occurs, and removing the wine from the filter and collecting the filtered wine in sterile equipment.

4. A process for treating wine to obviate pasteurization and the incorporation of bactericide additive, comprising precoating a multiplate filter with a diatomaceous earth filter aid, sterilizing the filter and that equipment beyond the filter to a point of collection with a liquid sterilizing agent, filtering the wine through the so-prepared filter to reduce the bacteria and yeast content below that at which growth occurs, and removing the wine from the filter and collecting the filtered wine in sterile equipment.

JULIUS H. FESSLER.

REFERENCES CITED

The following references are of record in the file of this patent:

UNITED STATES PATENTS

| Number | Name | Date |
| --- | --- | --- |
| 2,258,216 | Ramage | Oct. 7, 1941 |
| 2,419,628 | Cohen | Apr. 29, 1947 |

OTHER REFERENCES

"Micro-Organisms and Fermentation," by A. Jorgensen, rewritten by A. Hansen, pub. 1948 by Charles Griffin & Co. Limited, London, pages 114 and 115.

Industrial & Eng. Chemistry, February 1943, pages 251 to 254.